Figure 1:
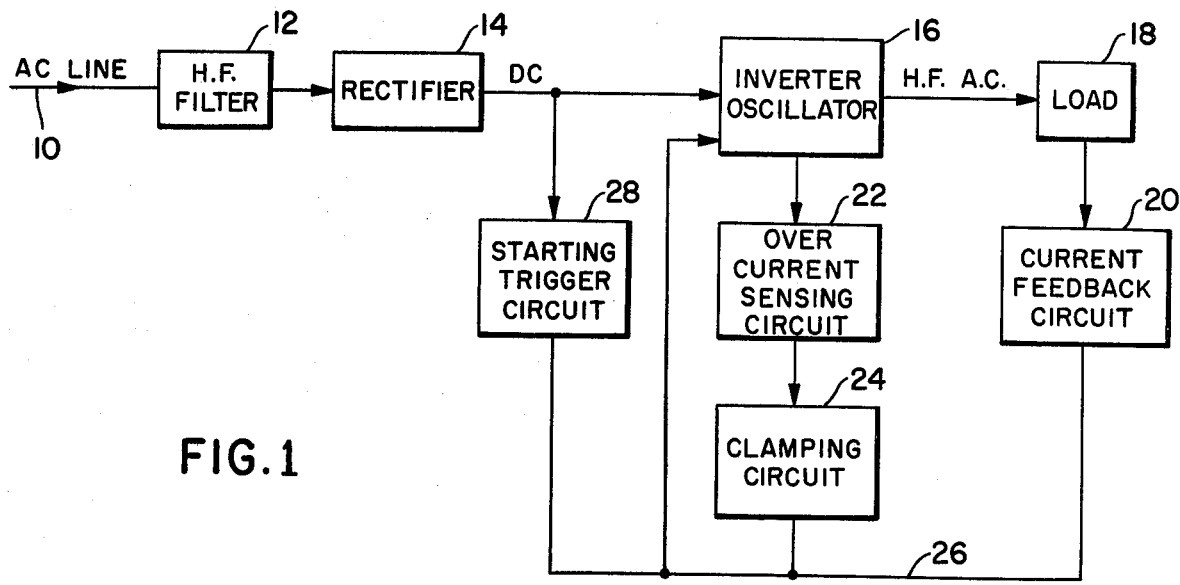

United States Patent [19]

Lawson, Jr.

[11] 4,104,715
[45] Aug. 1, 1978

[54] ALTERNATING CURRENT TO ALTERNATING CURRENT CONVERTER APPARATUS

[75] Inventor: Harry W. Lawson, Jr., Rush, N.Y.

[73] Assignee: Acme Electric Corp., Cuba, N.Y.

[21] Appl. No.: 776,403

[22] Filed: Mar. 10, 1977

[51] Int. Cl.² .......................................... H02M 5/458
[52] U.S. Cl. ...................................... 363/37; 363/56; 363/97; 315/DIG. 5
[58] Field of Search ................... 321/2, 16, 18, 11, 14; 315/DIG. 5; 363/34, 37, 55–57, 95–97

[56] References Cited

U.S. PATENT DOCUMENTS

| | | | |
|---|---|---|---|
| 3,243,725 | 3/1966 | Raposa et al. | 321/2 X |
| 3,327,244 | 6/1967 | Fay et al. | 321/2 X |
| 3,461,374 | 8/1969 | Rhyne, Jr. | 321/18 |
| 3,564,384 | 2/1971 | Adler | 321/2 |
| 3,667,027 | 5/1972 | Martin | 321/18 X |
| 3,701,937 | 10/1972 | Combs | 321/14 X |
| 3,829,794 | 8/1974 | Gautherin | 321/2 X |
| 3,959,710 | 5/1976 | Hill, Jr. | 321/18 X |
| 4,004,209 | 1/1977 | Lawson, Jr. | 363/37 |

*Primary Examiner*—William M. Shoop
*Attorney, Agent, or Firm*—Martin LuKacher

[57] ABSTRACT

Apparatus is described for converting alternating current at line frequency (50 or 60 Hz) into alternating current of much higher frequency and at a voltage suitable for operating loads such as lamps which draw high starting currents. The apparatus has a current feedback inverter oscillator which may be implemented by switching transistors connected in push-pull relationship through output and feedback transformers which have windings connected in series with the load. The load current is fed back through the feedback transformers so as to self-excite the oscillator at a frequency much greater than the line frequency. A sensing circuit responsive to the current which is fed back provides a control voltage. A clamping circuit is responsive to this control voltage and clamps the voltage at the base of the switching transistors so as to reduce collector peak current within the ratings of the transistors during high peak current draw conditions as occurs during lamp load turn-on. Lamp current gradually increases such that a "soft start" is provided. A trigger circuit which may be in the form of a relaxation oscillator coupled to the feedback transformer assures that the inverter oscillator will begin oscillating immediately upon connection to the load. When the load is disconnected the oscillations stop and the apparatus draws substantially no current.

19 Claims, 2 Drawing Figures

ALTERNATING CURRENT TO ALTERNATING CURRENT CONVERTER APPARATUS

The present invention relates to apparatus for applying alternating current to a load and particularly to alternating current to alternating current converter apparatus which is adapted to provide output alternating current of higher frequency than the input alternating current thereto.

The invention is especially suitable for use in apparatus for delivering power to the filament of a lamp such as a projection lamp used in motion picture or slide projectors. The invention is also suitable for operating other lamps such as fluorescent lamps or wherever high frequency alternating current is required by a load, as for example a power supply which filters and rectifies the alternating current so as to provide smooth direct current.

It has heretofore been the practice to use transformers for supplying power from the alternating current lines to the filament of a projection lamp at the voltage (usually lower than line voltage) at which the lamp is designed to operate. Other lamps, such as fluorescent lamps have utilized transformers, known as ballasts, to boost the voltage applied to such lamps. Energy is lost due to the inefficiency of such converter transformers and ballasts. Moreover the current required by such lamps necessitates transformers having such size and weight as to be material to the size and weight of smaller movie and slide projectors.

It has also long been desired to operate lamps at frequencies much higher than the ordinary line frequencies (viz, 50 to 60 Hz). The use of such higher frequencies increases the efficiency of the lamps in terms of input electrical power thereto and resulting illumination (foot candles) therefrom. Moreover, high frequency power is essential to the operation of the low voltage halogen lamps which are desired for use in movie and slide projectors. Alternating current to alternating current converters which have heretofore been available have not been entirely suitable in that losses in such converters have reduced if not substantially eliminated the gain in efficiency obtained by higher frequency operation of the lamp. Moreover, known converters have been unreliable in operation due for example to failures resulting from the high current drawn during lamp turn-on. Also the converters do not start reliably when the lamp is switched on. The cost and complexity of known converter circuits has also militated against their use in powering lamps. Heretofore, therefore, transformers and ballasts have been used for such applications in spite of the drawbacks thereof.

Accordingly, it is an object of the present invention to provide improved apparatus for supplying alternating current to a load of a frequency and/or voltage different from that of the alternating current available at the power lines.

It is a further object of the present invention to provide improved alternating current to alternating current converter apparatus which obviates the need for transformers and thereby enhances the efficiency of operation of a system for supplying current to a load.

It is a still further object of the present invention to provide apparatus for supplying alternating current to lamps for energizing lamps so as to enhance the efficiency of operation of the lamp system.

It is a still further object of the present invention to provide improved alternating current to alternating current converter apparatus which enables the elimination of transformers and ballasts from lamp systems.

It is a still further object of the present invention to provide improved alternating current to alternating current converter apparatus which provides controlled starting current upon lamp turn-on (i.e., "soft start" operation).

It is a still further object of the present invention to provide improved apparatus for supplying alternating current power to lamps as are used in movie and slide projectors which enables reduction in size and weight and flexibility in form factor so as to facilitate the design of such projectors.

Briefly described, alternating current to alternating current converter apparatus embodying the invention may be operated from the ordinary alternating current power lines. A rectifier or other converting means which is connected to the alternating current line provides direct current. An inverter oscillator is operated by this direct current. The oscillator is connected in current feedback relationship with the load, which may for example be a projection lamp. An over-current sensing circuit associated with the inverter oscillator senses any over-current condition as results when a lamp load is connected to the oscillator. The over-current sensing circuit provides a control voltage for reducing the oscillator output current when the control voltage exceeds a predetermined magnitude which corresponds to a current greater that the current ratings of the active devices in the oscillator. High frequency alternating current is supplied by the oscillator to the load and the current is controlled during periods when the load draws high current, as is the case upon lamp turn-on conditions. A starting circuit may also be used, which applies trigger signals together with the current feedback excitation, to the oscillator so as to assure self-starting whenever the load is connected to the oscillator. Reliable and efficient conversion of the input alternating current, from the line, to high frequency alternating current, at the load, is therefore accomplished.

Figure 2:
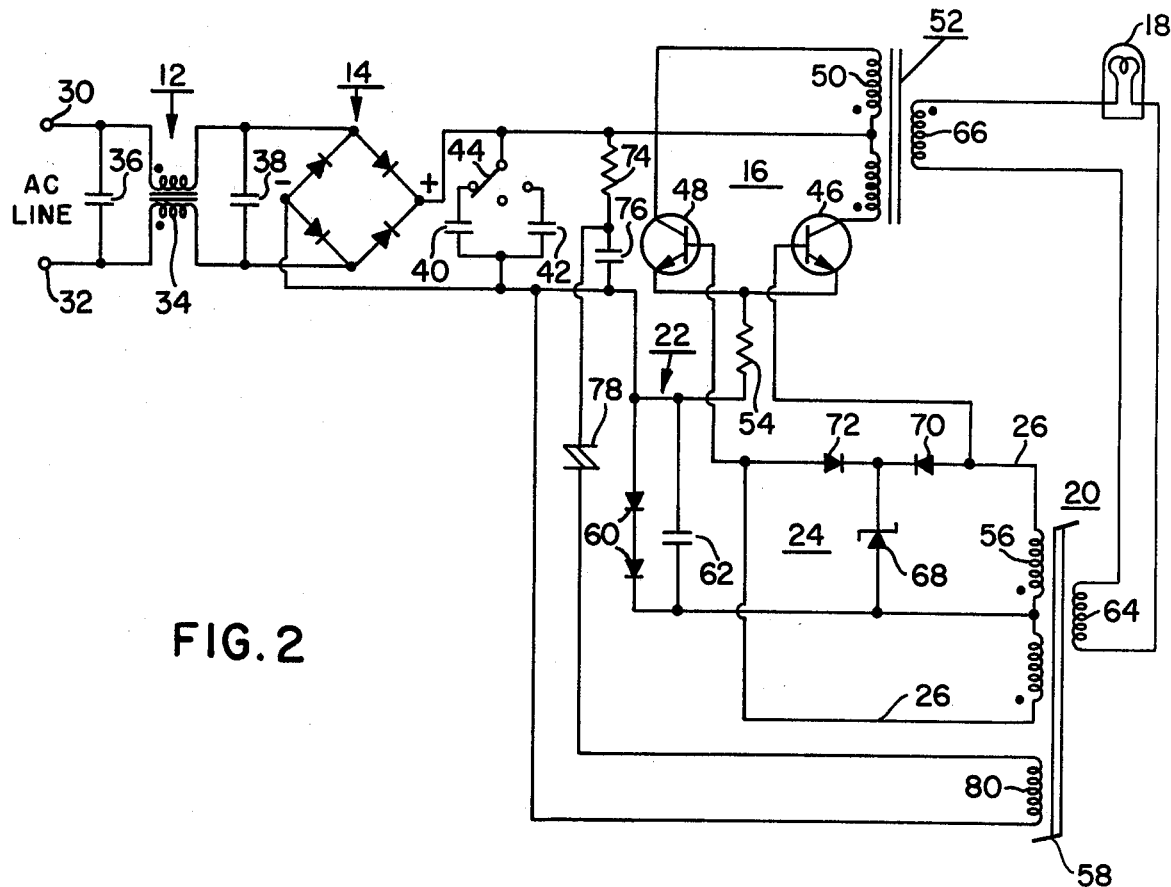

The foregoing and other objects and advantages of the invention as well as a presently preferred embodiment thereof will be more apparent from a reading of the following description in connection with the accompanying drawings in which FIG 1 is a functional block diagram of an alternating current to alternating current converter apparatus embodying the invention; and FIG. 2 is a schematic diagram of the converter apparatus as shown in FIG. 1.

Referring more particularly to FIG. 1, it will be seen that the alternating current line 10 is connected to a high frequency filter 12. The filter serves to suppress the transmission of high frequency alternating current which is generated in the apparatus. Such high frequency signals, if transmitted to the alternating current lines, can cause so called radio frequency interference (RFI) which may be deleterious to radio or television reception. Accordingly, the use of the high frequency filter is desirable and may be necessary to comply with governmental requirements respecting RFI. If the suppression of RFI is unnecessary, the filter 12 may be eliminated.

Alternating current at the line frequency (viz, 50 or 60 Hz) passes through the filter 12 and is rectified in a rectifier circuit 14 so as to provide direct current. This direct current is inverted into high frequency alternating current by an inverter oscillator 16. The oscillator is connected to the load and delivers the high frequency alternating current thereto. In applications where the load is a lamp, such as a projection lamp, the frequency of oscillation may suitably be in the kilohertz range, e.g., 32 KHz.

In the event that the load requires low voltage alternating current, such as is the case when the load is a filament of a projection lamp, the inverter oscillator may reduce that voltage by transformer action. For loads which require high voltage, such as fluorescent lamps, the voltage may be increased, similarly by transformer action. The use of high frequency alternating current, particularly in a discharge lamp such as a fluorescent lamp or a halogen projection lamp, results in higher illumination output, in terms, for example, of foot candles, than is the case when alternating current at the line frequency (50 to 60 Hz) is used to power such lamps. Accordingly, it is desirable to utilize high frequency alternating current.

The oscillator 16 is connected in current feedback relationship to the load 18 by means of a current feedback circuit 20. Connected to the oscillator is an over-current sensing circuit 22 which provides a control voltage for operating a clamping circuit 24. The clamping circuit is connected to the feedback path 26 to the oscillator 16. In the event over-current conditions as results upon lamp turn-on, the clamping circuit clamps the feedback path to effect reduction in the feedback drive. The current output from the oscillator is then reduced. The oscillator is prevented from drawing a current in excess of the ratings of the active devices, such as switching transistors which are included therein. Simultaneously the current to the load is reduced so as to prevent a shock of a high current at the load.

As the load continues to receive current, its effective resistance may, as in the case of a lamp filament, increase. The over-current sensing circuit then provides a lower control voltage which is insufficient to operate the clamping circuit and the oscillator continues to operate in a self-excited mode. In this manner peak currents in the oscillator are reduced to within the ratings of the active devices therein during the initial period when the load is connected to the oscillator. A catastrophic failure in these active devices would normally result upon load short circuit condition due to the current feedback operation. A cold incandescent lamp filament is in effect a short circuit on turn-on and would normally cause catastrophic failure in the absence of the over-current sensing circuit 22 and the clamping circuit 24. The current to the lamp is also reduced during starting which provides for a so-called soft start. Such soft start may extend lamp life.

The apparatus also utilizes a starting or trigger circuit 28. The trigger circuit is operated by the direct current from the rectifier and provides starting pulses to the oscillator 16 so as to assure self-starting action. The starting circuit draws only a small amount of current and therefore may be permanently connected to the direct current line. A switch (not shown) may be connected either between the inverter oscillator 16 and the load or elsewhere in the feedback path. Until the load is connected to the oscillator the oscillator remains off and draws substantially no current. Accordingly, only a single pole switch between the oscillator 16 and the load 18 or elsewhere in the feedback path 26 need be used. However, the lamp circuit may be switched at the input AC line 10 (viz, ahead of the filter 12) if desired. The need for only a single switch will simplify the design of projection lamp systems where oftentimes switching of the lamp independent of other projector components such as motors for fans or film drive, is desired.

The circuit of the alternating current to alternating current converter shown functionally in FIG. 1 is illustrated in FIG. 2. The alternating current line 10 is connected across input terminals 30 and 32 and provides input alternating current to the apparatus. The filter 12 is a RFI filter designed to suppress high frequencies above a few hundred Hz. The high frequency energy generated in the oscillator 16 thus is not transmitted back to the alternating current line. The filter 12 is provided by a common mode inductor or choke 34 which may be implemented by two windings on a toroidal core. Capacitors 36 and 38 are connected across the line on opposite sides of the choke 34.

The rectifier 14 is a full wave diode bridge rectifier. The pulsating full wave rectified current may be smoothed by capacitors 40 or 42 which are selectively connected across the direct current line at the output of the rectifier 14 by means of a switch 44. The capacitors may have different values of capacitance so as to provide different smoothing of the full wave rectified direct current. The higher the capacitance the greater the effective magnitude of the direct current. Accordingly, the direct current may be varied by selecting different ones of the capacitors 40 or 42 or neither of them by means of the switch 44. More capacitors may be used connected to a switch having more terminals so as to provide additional steps of voltage magnitude control and in smaller increments. By controlling the magnitude of the direct current voltage, the voltage provided to the load 18 may be controlled. The load 18 in FIG. 2 is shown as the filament of a lamp.

The inverter oscillator 16 is a push-pull current feedback oscillator circuit having a pair of switching transistors 46 and 48. These transistors are current control devices having three electrodes which are their base, collector and emitter electrodes. The output current path of the oscillator 16 is the path for the collector currents through the transistors. This path is through the primary winding 50 of an output transformer 52. This transformer is center tapped and the center tap is connected to the positive side of the rectifier 14. The emitter of the transistors are also connected in the output current path to a resistor 54. This resistor 54 is a part of the over-current sensing circuit 22. The resistor 54 is also in the feedback current path 26.

This feedback path 26 is defined by the secondary winding 56 of a feedback transformer 58. This feedback transformer has a core having a square loop hysteresis characteristic and also serves as a timing transformer to produce essentially square wave driving currents for the transistors 46 and 48. The secondary winding 56 is center tapped and the center tap is connected to the emitters of the transistors 46 and 48 by way of the sensing circuit 22. The opposite ends of the winding 56 are connected to the bases of different ones of the transistors 46 and 48. The sensing circuit 22 includes a diode or diodes 60 which establish a bias voltage between the base and emitter of the transistors 46 and 48. The diodes 60 are polarized such that when one of the transistors is turned on, the bias on the other will be to hold it off. A capacitor 62 is connected across the diodes so as to smooth the bias voltage. Any variations in the base to emitter voltage of the transistors 46 and 48 will be small as compared to the bias voltage established across the diode 60 because of the capacitor 62. Additional temperature compensation for variations in the base to emitter voltage is made unnecessary. The resistor 54 also provides a degeneration in the oscillator so that matching of the transistors 46 and 48 may be unnecessary.

The frequency at which the oscillator 16 is running is determined principally by the volt-second capability of the secondary winding 56 of the feedback transformer 58 which utilizes a square-loop core. The timing voltage, appearing across each half of the secondary winding 56, is that voltage consisting of the sum of the following voltage drops: the base to emitter drop of the "ON" transistor (48 or 46), the voltage drop across resistor 54, and the voltage drop across bias diodes 60. A suitable operating frequency is in the range of 32 KHz.

The current feedback circuit 20 is provided by the feedback transformer 58. The transformer 58 has a primary winding 64. The output transformer 52 has a secondary winding 66. The feedback transformer primary winding, the output transformer secondary winding and the filament of the lamp which provides the load 18 are connected in series. Therefore, the high frequency alternating current which flows through the load is fed back by the feedback transformer 58 along the feedback path 26.

The voltage applied to the load is determined by the turns ratio of the output transformer and the direct current voltage amplitude provided by the rectifier and such of the smoothing capacitors 40 and 42 which are switched into the circuit by the switch 44. In the circuit illustrated in FIG. 2 the direct current voltage may have a magnitude approximately equal to the line voltage. Accordingly, if the load 18 is a projection lamp of the type having a low voltage filament, the output transformer 52 is a step-down transformer. However, if the load is a high voltage lamp, such as a fluorescent lamp, a step-up transformer may be used as the output transformer.

The clamping circuit 24 is provided by a zener diode 68 and a pair of high-speed switching diodes 70 and 72. The switching diode 70 and the zener diode 68 are connected across one-half of the center tapped feedback transformer secondary winding while the other switching diode 72 connects the zener diode 68 across the other half of the center tapped secondary winding 56. As so connected, the switching diodes 70 and 72 are polarized oppositely to the zener diode 68 and in a direction to pass current through the zener diode 68 when its zener breakdown voltage is exceeded. Unless the zener breakdown voltage of the zener diode 68 is exceeded, there is no current through either the switching diode 70 or 72 and the zener diode 68 and the clamping circuit 24 is effectively disconnected. However, when the zener breakdown voltage is exceeded, as is the case during an over-current condition as occurs when the lamp is first turned on, zener breakdown will occur and the voltage applied to the bases of the transistors 46 and 48 will be clamped and limited to the zener breakdown voltage. The collector current corresponding to this voltage will be below the current rating of the transistors 46 and 48. Accordingly, the transistors will be protected against catastrophic failure. The output current to the load will also be reduced which is also beneficial in many applications. Limitation of current reduces the cold lamp in-rush current and provides a so-called slow start which is believed to extend lamp life.

The starting circuit 28 is provided by a resistor 74 and a capacitor 76 which form a charging circuit. The capacitor 76 charges slowly through the resistor 74 towards a voltage equal to the peak value of the DC voltage which appears across the output of the rectifier 14. Connected in series across the capacitor is a solid state voltage responsive switch device 78 and a winding 80 of the feedback transformer 58. This winding 80 is wound on the same core as the primary and secondary windings 64 and 56. A toroidal core 58 may suitably be used. The core of the output transformer 52 may also be of toroidal shape.

The solid state switching device 78 is suitably an avalanche or breakover diode. A bidirectional breakover device as illustrated in FIG. 2 may be used. Such devices are commercially available; for example the General Electric's Type ST-4 being suitable. The starting circuit operates as a relaxation oscillator at a very slow rate, much slower than the frequency of the input alternating current. This rate may for example be 2Hz. When the load 18 is connected to the secondary 66 of the output transformer, or when the apparatus is connected to the AC line, the trigger signals provided by the starting circuit will induce starting pulses through the transformer so as to cause conduction in one of the transistors 46 and 48. The starting circuit 24 thus assures that the oscillator 16 will start oscillating.

When oscillations commence, the filament of the lamp 18 is cold and presents essentially a short circuit. High current is induced into the secondary winding 56 such that the transistors are switched to saturation and abnormally high collector currents instantaneously flow through the output transformer primary, the collector to emitter path of the transistor 46 or 48 which is turned on, and the resistor 54 in the sensing circuit 22. By virtue of the diode 60 in the sensing circuit, this high voltage appears as a control voltage across one of the halves of the secondary winding 56 of the feedback transformer 58, which half depending upon which of the transistors 46 or 48 is conducting. This voltage serves as a control voltage and is applied across the zener diode 68 in the clamping circuit 24 by one of the switching diodes 70 and 72.

During the period of the initial over-current when the lamp is first turned on, the control voltage will be in excess of the zener breakdown voltage of the diode 68. Since the zener diode 68 is connected via the switching diodes 70 and 72 to the bases of the transistors 46 and 48, these bases will be clamped to the zener breakdown voltage. As noted above, this breakdown voltage is below the voltage corresponding to the maximum current rating of the transistors 46 and 48. The transistors 46 and 48 will therefore be protected against catastrophic failure due to over-current. Furthermore, the transistors are pulled out of saturation when clamped to the zener breakdown voltage. This increases collector dissipation and reduces current in the output transformer primary 50. The current induced into the secondary 66 of the output transformer 52 is consequently reduced and the current fed back by way of the feedback transformer 58 is correspondingly reduced. The control voltage across the secondary winding 56 of the feedback transformer 58 then drops below the zener breakdown voltage and the clamping circuit 24 is effectively disconnected. The current to the load therefore increases gradually providing for a soft start. It will be appreciated that the oscillator is protected by means of the sensing circuit 22 and clamping circuit 24 from all over-current conditions regardless of the source thereof (viz, cold lamp, inrush current or other short circuit conditions).

From the foregoing description it will be apparent that there has been provided improved apparatus for providing operating current to loads. The invention has been described as embodied in an AC to AC converter circuit for providing high frequency current to a load. Various types of loads such as incandescent and fluorescent lamps and power supplies such rectify and capacitively filter such high frequency current for application to a direct current load have been mentioned above. Other loads as well as other variations and modifications in the hereindescribed apparatus, within the scope of the invention, will undoubtedly suggest themselves to those skilled in the art. Accordingly, the foregoing description should be taken as illustrative and not in any limiting sense.

What is claimed is:

1. Alternating current to alternating current converter apparatus which provides controlled alternating current to a load, said apparatus comprising
    (a) means for converting input alternating current into direct current,
    (b) means for inverting said direct current into alternating current and applying said alternating current therefrom to said load, said inverting means comprising
        (1) oscillator means connected in current feedback relationship with said load for self excitation thereof by said load current,
        (2) means for sensing the output current of said oscillator and providing a control voltage, and
        (3) means responsive to said control voltage for reducing said oscillator output current without cutting off said oscillator output current when said control voltage exceeds a predetermined magnitude.

2. The invention as set forth in claim 1 further comprising means operated by said converting means for generating a trigger signal and for applying said trigger signal to said oscillation means to excite the start of oscillation therein.

3. The invention as set forth in claim 2 wherein said oscillator includes a current feedback circuit and said trigger signal generating means includes a charging circuit in which a capacitor is charged by direct current from said converting means through a resistor, and an avalanche type device connected across said capacitor and to said feedback circuit for generating said trigger signal when said capacitor becomes charged to the breakdown voltage of said device and applying said signal through feedback circuit to said oscillator means.

4. The invention as set forth in claim 3 wherein said feedback circuit includes a feedback transformer connected between said load and said oscillator, said feedback transformer having a winding which is connected in series with said device across said capacitor.

5. The invention as set forth in claim 1 wherein said oscillator means is operative at a much higher frequency than the frequency of said input alternating current to provide said alternating current to said load at said much higher frequency.

6. The invention as set forth in claim 5 wherein said oscillator means includes means for applying said higher frequency alternating current to said load at a lower voltage than the voltage of said input alternating current which is adapted to operate low voltage devices such as the filaments of lamps and the like.

7. The invention as set forth in claim 5 wherein said oscillation means includes means for applying said higher frequency alternating current to said load at a higher voltage than the voltage of said input alternating current which is adapted to operate high voltage lamps such as fluorescent lamps and the like.

8. The invention as set forth in claim 5 wherein said converting means is a rectifier means which provides pulsating direct current, a plurality of capacitors having different values of capacitance and means for selectively connecting said capacitors across said rectifier whereby to vary the magnitude of said direct current.

9. The invention as set forth in claim 5 further comprising filtering means for preventing the transmission of alternating current at such higher frequency connected to the input of said converting means whereby to suppress interference due to said higher frequency current from being transmitted to the source of said input alternating current, such as the alternating current lines.

10. The invention as set forth in claim 1 wherein
    (a) said oscillator means comprises a current control device having at least three electrodes, the first of which controls the flow of current between the second and third thereof, an output transformer and a feedback transformer, said output transformer having primary and secondary windings, said feedback transformer having primary and secondary windings, a path for said output current defined by said output transformer primary winding and said device between said second and third electrodes thereof, said output current path also providing a circuit path for said direct current from said converting means, a feedback current path defined by said feedback transformer secondary and said device between said first and third electrodes thereof, and said output transformer secondary winding, said load and said feedback transformer primary being connected in series with each other to provide feedback of said load current to excite said oscillator; and
    (b) wherein said sensing means includes a resistor common to said output and feedback current paths for generating said control voltage; and
    (c) wherein said output current reducing means includes a clamping circuit connected across said feedback transformer secondary winding for clamping the voltage back between said first and third electrodes to a voltage corresponding to a current less than the current rating of said device when said control voltage exceeds said predetermined magnitude corresponding to a current in excess of said rating.

11. The invention as set forth in claim 10 wherein said clamping circuit includes a zener diode.

12. The invention as set forth in claim 10 wherein said sensing means further comprises at least one diode connected in said feedback current path for establishing a bias voltage across said first and third electrodes.

13. The invention as set forth in claim 12 further comprising a capacitor connected across said diode.

14. The invention as set forth in claim 10 wherein said oscillation means further comprises a pair of said devices connected in push pull relationship with said second electrodes thereof connected to opposite ends of said output transformer primary winding and said first electrodes thereof connected to opposite ends of said feedback transformer primary winding, said clamping circuit comprising a zener diode and a pair of diodes connected to said zener diode polarized in opposite directions with respect to said zener diode, said feedback transformer primarily having a center tap, one of said pair of diodes and said zener diode being connected between said center tap and one end of said feedback transformer secondary winding, and the other of said pair of diodes and said zener diode being connected between said center tap and the other end of said feedback transformer secondary winding.

15. The invention as set forth in claim 14 wherein said devices are switching transistors and said first, second and third electrodes are respectively the base, collector and emitter thereof.

16. The invention as set forth in claim 15 wherein said feedback transformer is a timing transformer having a core of material having square loop hysteresis characteristics on which said primary and secondary winding thereof are wound such that said oscillator is tuned to a frequency of oscillation, which is higher than the frequency of said input alternating current.

17. The invention as set forth in claim 16 wherein said apparatus further comprises a relaxation oscillator operative at a frequency lower than said input alternating current frequency, said feedback transformer having another winding connected to said relaxation oscillator for providing trigger signals for assuring initiation of oscillations in said oscillator means.

18. The invention as set forth in claim 10 wherein said load is a lamp filament.

19. The invention as set forth in claim 10 wherein said converting means is a rectifier circuit which provides a pulsating direct current at its output, a plurality of smoothing capacitors having different values of capacitance, and switch means for selectively connecting different ones of said capacitors across the output of said rectifier for varying the direct current amplitude of said pulsating output.

* * * * *